(12) United States Patent
Wang et al.

(10) Patent No.: US 7,836,623 B2
(45) Date of Patent: Nov. 23, 2010

(54) ROTARY POSITIONING STRUCTURE FOR A FRAME

(75) Inventors: Jianguo Wang, Shanghai (CN); Steven Tseng, Taipei (TW); David Ho, Taipei (TW)

(73) Assignee: Inventec Appliances Corp., Wugu (TW)

( * ) Notice: Subject to any disclaimer, the term of this patent is extended or adjusted under 35 U.S.C. 154(b) by 133 days.

(21) Appl. No.: 12/379,913

(22) Filed: Mar. 4, 2009

(65) Prior Publication Data

US 2009/0223101 A1 Sep. 10, 2009

(30) Foreign Application Priority Data

Mar. 4, 2008 (TW) ................. 97203651 U

(51) Int. Cl.
*A47G 1/16* (2006.01)

(52) U.S. Cl. .......................... 40/747; 248/458

(58) Field of Classification Search .......... 40/747, 40/748, 749, 753, 754; 348/843; 248/458, 248/447

See application file for complete search history.

(56) References Cited

U.S. PATENT DOCUMENTS

| | | | | |
|---|---|---|---|---|
| 730,261 A | * | 6/1903 | Hartley | 40/748 |
| 1,001,403 A | * | 8/1911 | Hipwell et al. | 40/747 |
| 1,993,947 A | * | 3/1935 | Rosenberg et al. | 40/747 |
| 2,456,720 A | * | 12/1948 | Miles | 40/747 |
| 3,343,777 A | * | 9/1967 | Becker | 248/455 |
| 5,329,712 A | * | 7/1994 | Keller | 40/747 |
| 6,003,260 A | * | 12/1999 | Chang | 40/748 |
| 6,014,829 A | * | 1/2000 | Wilson et al. | 40/753 |
| 6,651,943 B2 | * | 11/2003 | Cho et al. | 248/122.1 |
| 2007/0062089 A1 | * | 3/2007 | Homer et al. | 40/754 |
| 2008/0016742 A1 | * | 1/2008 | Hao | 40/753 |

* cited by examiner

*Primary Examiner*—Gary C Hoge
(74) *Attorney, Agent, or Firm*—Oliff & Berridge, PLC

(57) ABSTRACT

A rotary positioning structure is disclosed for a frame. The frame comprises a housing and a spindle hole disposed on the rear of the housing. The rotary positioning structure comprises elastic members and a rotary stand. Each of the elastic members comprises a tenon and the elastic members are arranged on a circular path surrounding the spindle hole. The rotary stand comprises a rotary shaft and a groove. When the rotary shaft is inserted into the spindle hole, the groove engages with the tenon so that the housing is supported in a first upright position by the rotary stand; also after said rotary shaft is inserted into said spindle hole and then the rotary stand is pivoted on the rotary shaft, the groove engages with another tenon of the elastic members so that the housing is supported in a second upright position by the rotary stand.

14 Claims, 6 Drawing Sheets

ROTARY POSITIONING STRUCTURE FOR A FRAME

FIELD OF THE INVENTION

The present invention relates to a rotary positioning structure, and more particularly to the rotary positioning structure for a frame.

BACKGROUND OF THE INVENTION

Please refer to a FIG. 1 for a stereo view of a rotary positioning structure of a digital photo frame in accordance with the prior art. The digital photo frame 1 comprises a housing 11, a stand 12 and a shaft connecting portion 13. The housing 11 and the stand 12 are rotatably connected via the stand 12 such that the housing 11 is supported by the stand 12 when the stand 12 is rotated to a predetermined position via the shaft rotating portions 13. However, a gravity center shift problem occurs when applying this method.

Another supporting method adopted is by using the hinge to replace the shaft connecting portion 13 for two-step rotation, in which the method of using the metal and the magnet to attract each other is also adopted, in order to achieve the supporting efficacy. However, the costs of such supporting methods aforementioned are expensive. Besides, it is inconvenient to assemble and disassemble such supporting structure, and it results in increase of the packing volume, hard fixing, and increase of cost of the product.

In view of the drawbacks of the prior art, the objective of the present invention aims to provide a simple supporting structure with a detachable rotary stand for better engagement at much lower cost of total product. The inventor of the present invention based on years of experience to conduct extensive researches and experiments, and finally developed a rotary positioning structure of a digital photo frame to overcome the drawbacks of the prior art.

SUMMARY OF THE INVENTION

As aforementioned, the objective of the present invention is to provide a rotary positioning structure for frame, particularly, the housing of the frame has spindle holes located thereon, so that the rotary stand comprising the rotary shaft can connect with the frame by inserting to such spindle hole, and assist the frame to stand firmly.

Another object of the present invention is to provide a rotary positioning structure for a frame, particularly at least two elastic members comprising the tonen are disposed inside the spindle hole of the housing, and a groove is being disposed on the rotary shaft of the rotary stand. When the groove engages with another tenon, it can change the corresponding position with relation to the frame and the rotary stand, so as to achieve the different standing arrangements.

To achieve the foregoing object, the present invention provides a rotary positioning structure of a frame. The frame comprises a housing and a spindle hole disposed on the rear of said housing. The rotary positioning structure comprises at least two elastic members and a rotary stand. Each of the elastic members comprise a tenon and the elastic members are arranged on a circular path surrounding the spindle hole. The rotary stand comprises a rotary shaft and a groove, the rotary shaft is disposed at one end of the rotary stand, and the groove is disposed on the rotary shaft. When the rotary shaft is inserted into the spindle hole, the groove engages with the tenon so that the housing can be supported in an upright position by the rotary stand; also after said rotary shaft is inserted into said spindle hole and then the rotary stand is pivoted on the rotary shaft, the groove engages with another tenon of said at least two elastic members so that the housing can be supported in another upright position by the rotary stand.

To explain the technical characteristics and effects of the present invention, we use preferred embodiments with related drawings for the detail description of the present invention.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

The forgoing and other objects, features and advantages of the present invention will be better understood from the following detailed description taken with the accompanying drawing, and the same referring numerals are used for the same components in accordance with the present invention.

Figure 1:
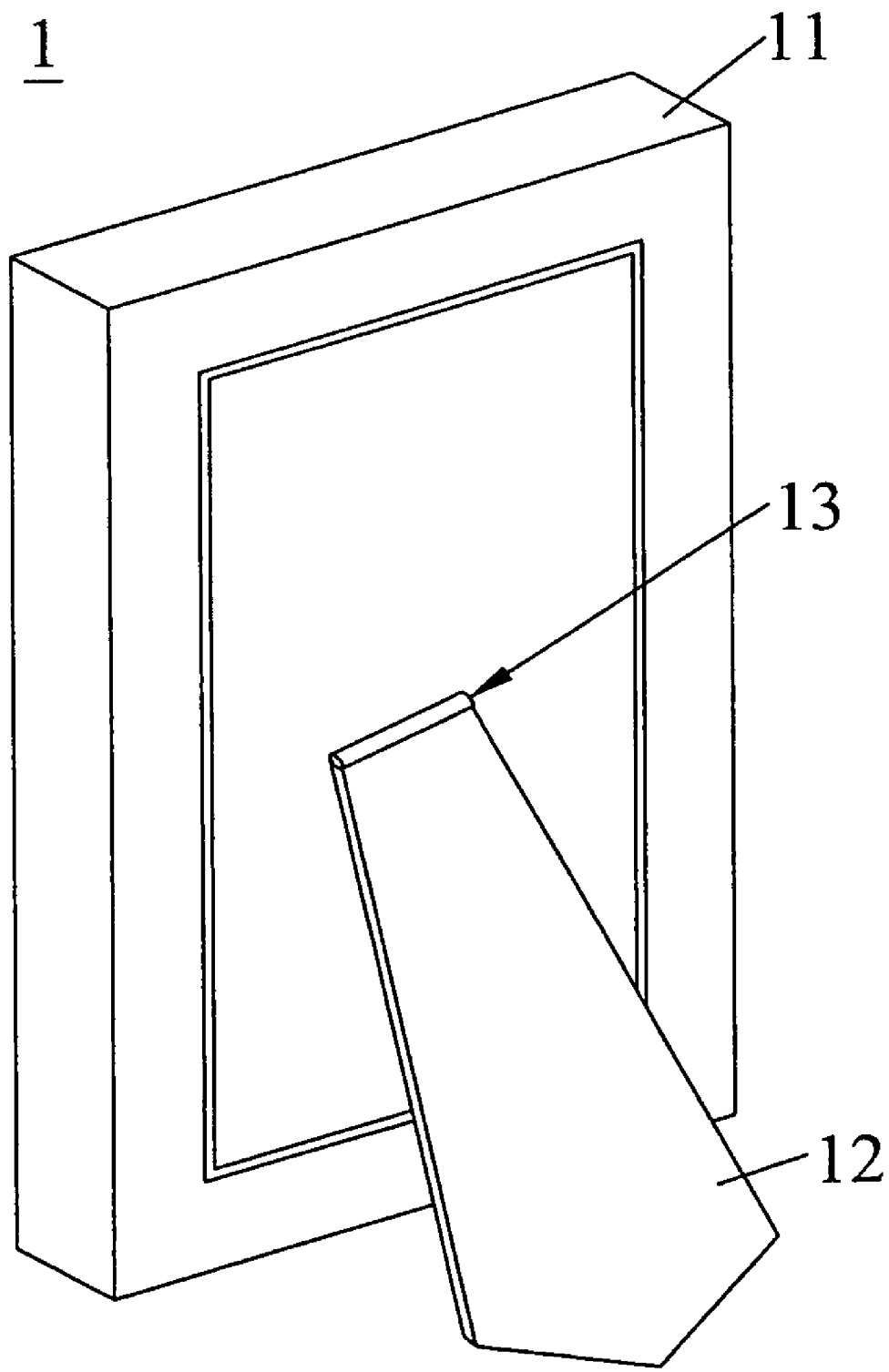
FIG. 1 is a stereo view of a rotary positioning structure for a frame in accordance with the prior art.
Figure 2:
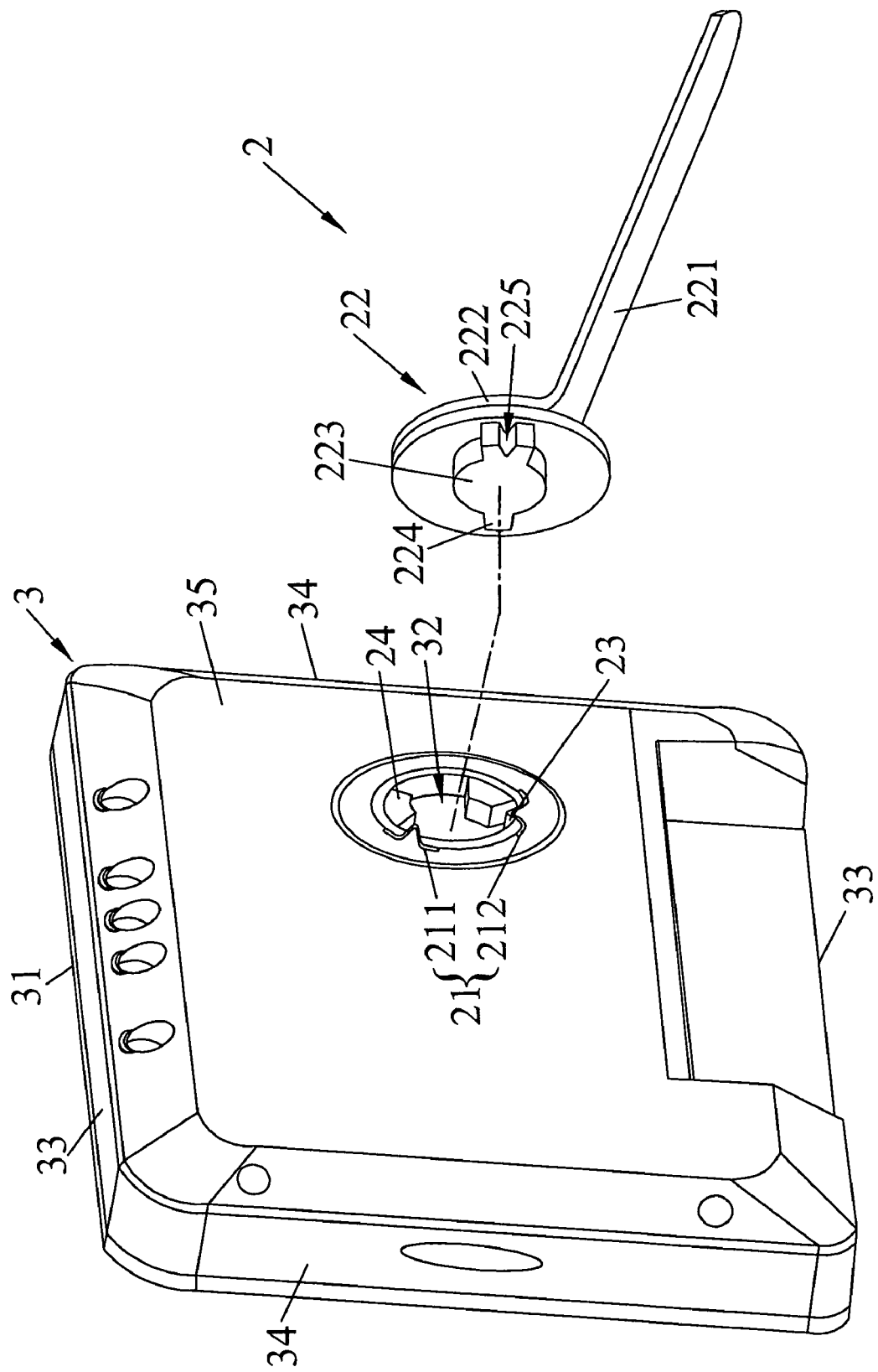
FIG. 2 is a three-dimensional decomposition view of a rotary positioning structure for a frame in accordance with the present invention.

Please refer to FIG. 2 for three-dimensional decomposition view of a rotary positioning structure for a frame in accordance with the present invention. The rotary positioning structure 2 is attached to a frame 3. The frame comprises a housing 31 and a spindle hole 32. The housing 31 is in a rectangular shape with a couple of first side 33 and a couple of second side 34. A screen (un-shown in the FIG. 2) is disposed on the front of the housing 31. The spindle hole 32 is disposed on the rear 35 opposing to the front.

The rotary positioning structure 2 comprises at least two elastic members 21 and a rotary stand 22. In the embodiment, the number of the elastic members 21 is two for explanation, including the first elastic member 211 and the second elastic member 212 respectively. Each of the elastic members 21 comprises a tenon 23. The elastic members 21 are arranged on a circular path surrounding the spindle hole 32. The first elastic member 211 and the second elastic member 212 are arranged with an interval corresponding to an angle of ninety degrees in between. Besides, two position members 24 not within the interval are located adjacent to the first elastic member 211 and the second elastic member 212, respectively.

The rotary stand 22 comprises a strut 221, a connecting end 222, a rotary shaft 223, a groove 224 and a position block 225. The strut 221 is attached to the connecting end 222 with a predetermined angle between the strut 221 and the connecting end 222. The rotary shaft 223 is disposed on the connecting end 222. The groove 224 and the position block 225 are disposed respectively on two opposite sides of the rotary shaft 223. Preferably, the groove 224 is in a V shape.

When the rotary shaft 223 of the rotary stand 22 is inserted into the spindle hole 32 of the housing 31 for connecting the housing 31 and the rotary stand 22, the rotary stand 22 can support the housing 31 to stand. The rotary stand 22 can support the housing 31 at various supporting angles based on different predetermined angles existing between the strut 221 and the connecting end 222.

Figure 3A:
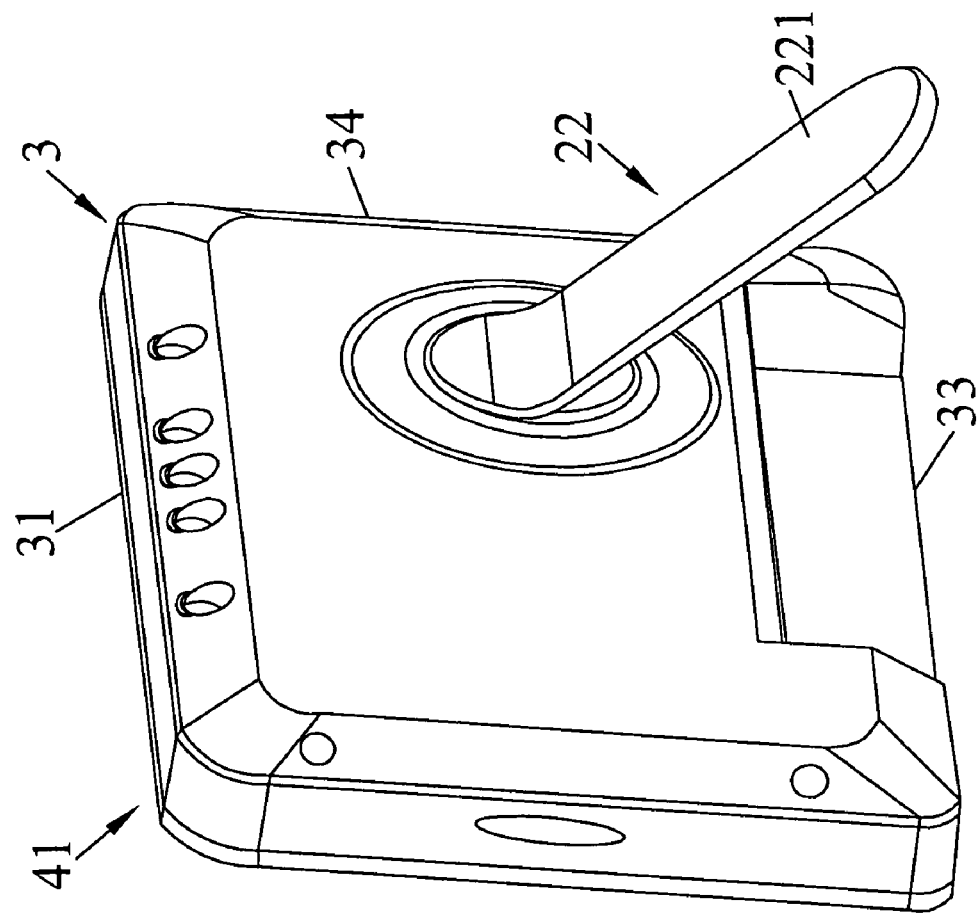
FIG. 3A is a view of a frame which is supported in the first upright position by a rotary positioning structure in accordance with the present invention.
Figure 3B:
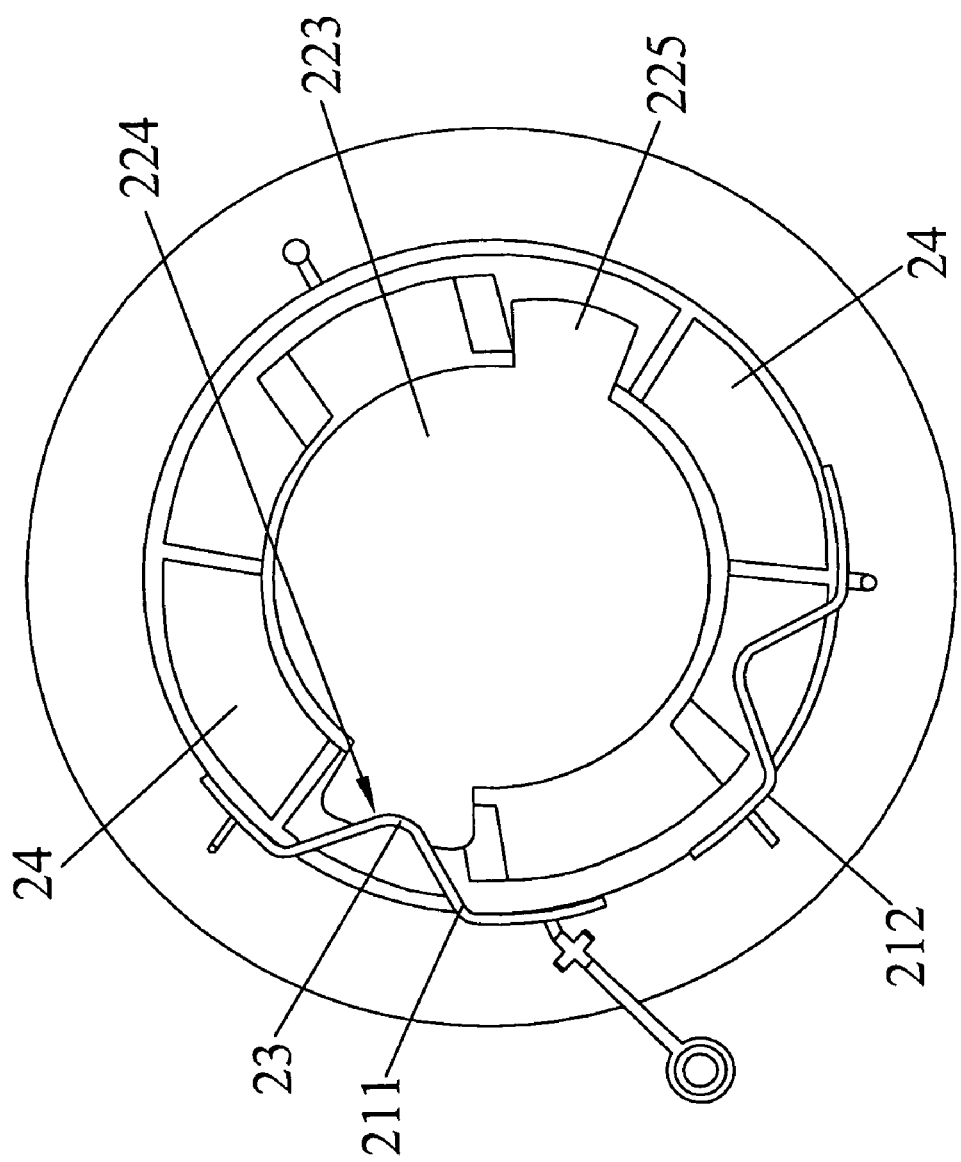
FIG. 3B is a view of the relationship between the rotary shaft and the spindle hole in accordance with the present invention while a frame which is supported in the first upright position.

Please refer to FIGS. 3A and 3B for a view of a frame which is supported in the first upright position by a rotary positioning structure in accordance with the present invention, and a view of the relationship between the rotary shaft and the spindle hole of such rotary positioning structure while a frame is supported in the first upright position. Here, the same reference numerals are used for the same components as those described above.

When the rotary shaft 223 of the rotary stand 23 is attached to the spindle hole 32 of the frame 3, and the frame 3 is placed against the rotary stand 22, the first side 33 of the housing 31 of the frame 3 is leaning on the rotary stand 22 so that the frame 3 can be supported in the first upright position 41 by the rotary stand 23. In this situation, the groove 224 of the rotary shaft 223 engages with the tenon 23 of first elastic member 211 in the spindle hole 32, and the position block 225 opposite to the groove 224 rests on the position member 24 adjacent to the second elastic member 212. Therefore, an engagement relation can be formed between the rotary shaft 223 and the spindle hole 32, as shown in FIG. 3B.

Figure 3C:
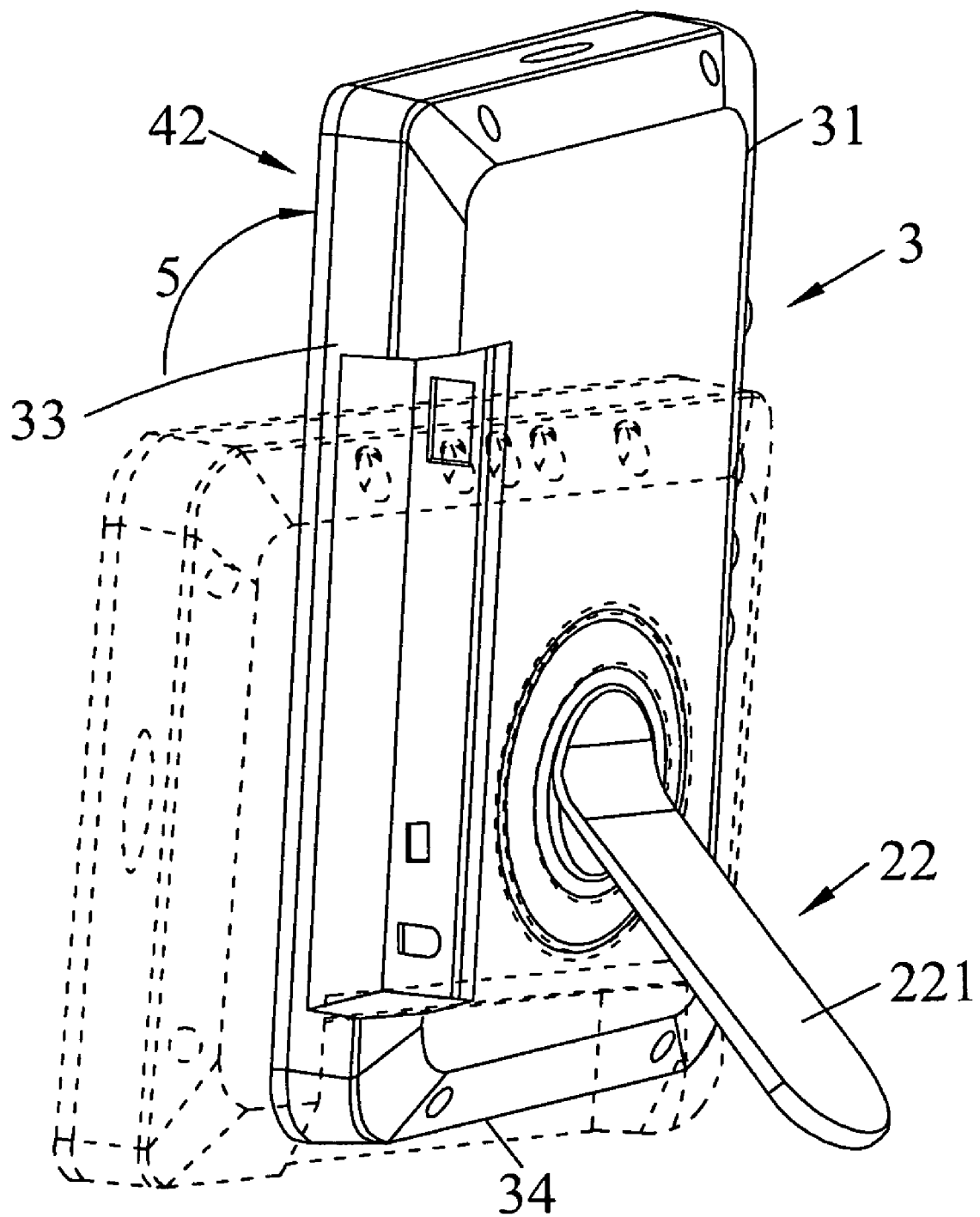
FIG. 3C is a view of a frame which is supported in the second upright position by a rotary positioning structure in accordance with the present invention.
Figure 3D:
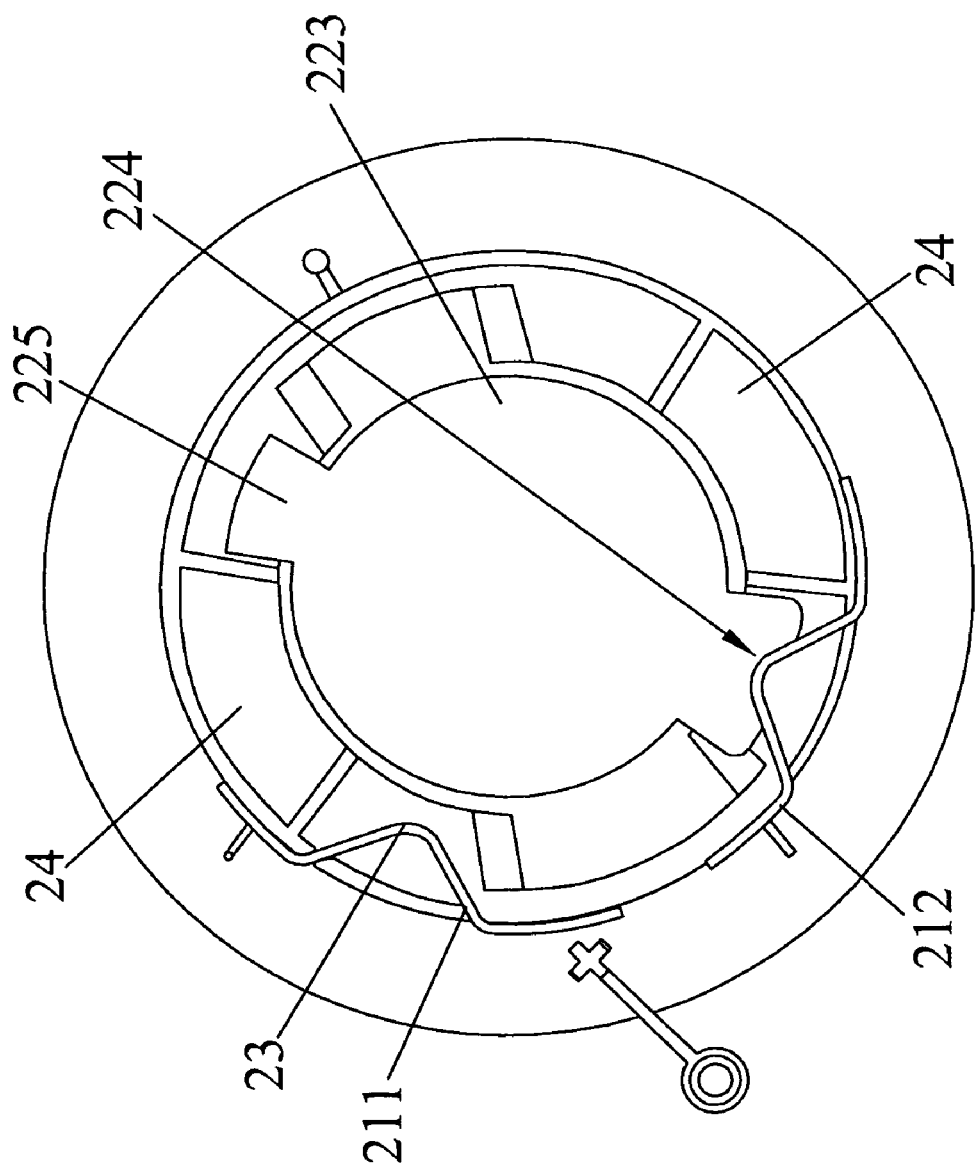
FIG. 3D is a view of the relationship between the rotary shaft and the spindle hole in accordance with the present invention while a frame is supported in the second upright position.

Please refer respectively to FIGS. 3C and 3D for a view of a frame which is supported in the second upright position by a rotary positioning structure in accordance with the present invention, and a view of the relationship between the rotary shaft and the spindle hole while such frame is supported in the second upright position. When the frame 3 pivots, in a movement 5 by an applied force, on the rotary shaft 223 to cause a second side 34 of the housing 31 of the frame 3 to lean on the rotary stand 22, the frame 3 can be supported in the second upright position 42 by the rotary stand 23, as shown in FIG. 3C.

While the frame 3 is pivoting on the rotary shaft 223, the groove 224 is separated from the tenon 23 of the first elastic member 211, and turns toward the second elastic member 212 to the extent that groove 224 engages with the tenon 23 of the second elastic member 212, and the position block 225 then rests on the position member 24 adjacent to the first elastic member 211 for forming an engagement relation, and this can prevent the damage due to further pivoting the rotary positioning structure 2.

As described above, a feature of the present invention of the rotary positioning structure is using a spindle hole in the frame such that the rotary stand comprising a rotary shaft can provide firmly support for the frame to stand. At least two elastic members comprising a tenon are disposed within the spindle hole to engage with the groove of the rotary shaft in order to provide various standing positions, such as to fully overcome the drawbacks set forth with respect to both the cost and supporting problems that the conventional supporting structure has met.

It is noted that the embodiment of rotary positioning structure mentioned above comprises two elastic members, and the frame can be supported in two upright positions. However, the invention can be implemented in many ways and is not limited to the particular embodiments described above. For example, the number of elastic members of the rotary positioning structure can be designed based on the total upright positions of the frame. If the frame can be adjusted to five upright positions, the rotary positioning structure can be designed to have, for example, five elastic members, and the arrangement of these elastic members corresponds to these upright positions for well supporting.

While the invention has been described in terms of specific embodiments of the present invention, it is not limited to such detail since numerous modifications and variations could be made thereto by those skilled in the art without departing from the scope and spirit of the present invention. Therefore, the features and advantages of the present invention will be set forth in the claims.

What is claimed is:

1. A rotary positioning structure for a frame, said frame comprising a housing and a spindle hole disposed on the rear of said housing, said rotary positioning structure comprising:
    at least two elastic members, arranged on a circular path surrounding the spindle hole, each of said at least two elastic members comprising a tenon; and
    a rotary stand comprising a rotary shaft and a groove, said rotary shaft being disposed at one end of said rotary stand, and said groove being disposed on said rotary shaft;
    wherein when said rotary shaft is inserted into said spindle hole, said groove engages with said tenon so as to support said housing in a first upright position by said rotary stand; also after said rotary shaft is inserted into said spindle hole and then said rotary stand is pivoted on said rotary shaft, said groove engages with another tenon of said at least two elastic members so as to support said housing in a second upright position by said rotary stand.

2. The rotary positioning structure of claim 1, wherein one of said elastic members comprises a metal material.

3. The rotary positioning structure of claim 1, wherein one of said elastic members comprises an elastic fragment.

4. The rotary positioning structure of claim 1, wherein said elastic members comprise a first elastic member and a second elastic member.

5. The rotary positioning structure of claim 4, wherein said spindle hole has two positioning members disposed adjacent to said first elastic member and said second elastic member respectively.

6. The rotary positioning structure of claim 5, wherein said rotary shaft further comprises a positioning block which rests on one of said positioning members after said rotary shaft is inserted into said spindle hole.

7. The rotary positioning structure of claim 6, wherein said positioning block is disposed on said rotary shaft, and the position of said positioning block is opposite to the position of said groove.

8. The rotary positioning structure of claim 1, wherein said housing is in a rectangular shape with two opposite first sides and two opposite second sides.

9. The rotary positioning structure of claim 8, wherein one of said first sides serves as a supporting side when said housing is supported in said first upright position.

10. The rotary positioning structure of claim 8, wherein one of said second sides serves as a supporting side when said housing is supported in said second upright position.

11. The rotary positioning structure of claim 8, wherein the front of said housing opposite to the rear is a screen.

12. The rotary positioning structure of claim 8, wherein said rotary stand further comprises a strut and a connecting end, and said rotary shaft is disposed on said connecting end.

13. The rotary positioning structure of claim 12 wherein said strut is attached to said connecting end with a predetermined angle between said strut and said connecting end.

14. The rotary positioning structure of claim 8, wherein said groove is in a V shape.

* * * * *